P. JUHASZ.
WIRELESS SAFETY SHIP SIGNAL.
APPLICATION FILED MAR. 1, 1915.

1,177,708.

Patented Apr. 4, 1916.

Witnesses:
John Braunwalder
Jos. O'Halloran

Inventor:
Paul Juhasz
A. J. Kopcsa
Att'y

UNITED STATES PATENT OFFICE.

PAUL JUHASZ, OF SOUTH BEND, INDIANA.

WIRELESS SAFETY SHIP-SIGNAL.

1,177,708.  Specification of Letters Patent.  Patented Apr. 4, 1916.

Application filed March 1, 1915. Serial No. 11,445.

*To all whom it may concern:*

Be it known that I, PAUL JUHASZ, a citizen of the United States, and residing at South Bend, county of St. Joseph, and State of Indiana, have invented a new and useful Improvement in Wireless Safety Ship-Signals, of which the following is a specification.

My invention relates to that class of devices which provide means for receiving wireless communications on board ship and using same to operate safety signaling apparatus.

The object of my invention is to provide means for determining the approach, and direction of approach, of ships at sea and to give visual and automatic warning of such approach. I attain these objects by the system of operation of wireless receiving apparatus illustrated in the accompanying drawing, in which—

Figure 1:
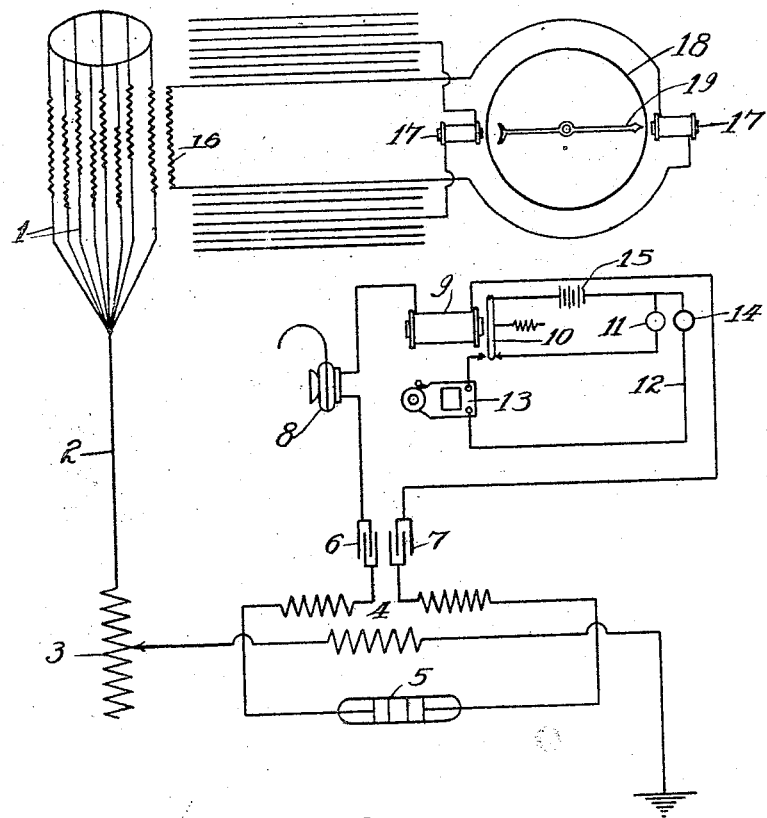
Figure 2:
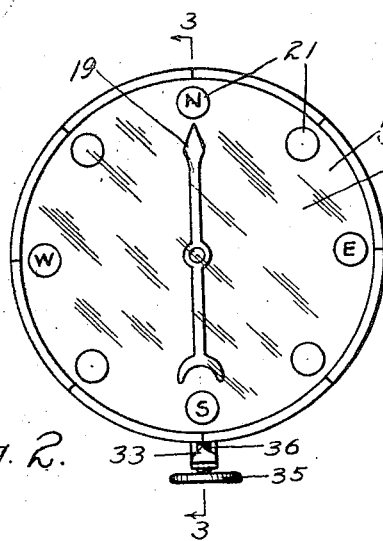
Figure 3:
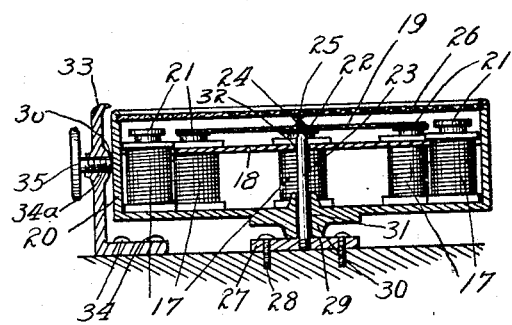

Figure 1 shows a diagrammatic representation of a wireless receiving station embodying my invention in signaling apparatus. Fig. 2 shows a plan view of the instrument indicating the direction from whence the wireless message is received. Fig. 3 shows a sectional elevation on the line 3—3 of Fig. 2.

In the Fig. 1 is shown a multiple wave receiving antennæ 1, so arranged aboard ship as to locate definitely the various points of compass with relation to the fore and aft position of the ship. These multiple wave receiving antennæ are then connected together to form a single receiving wire 2 and connect with the usual wireless receiving apparatus, composed of a variable inductance coil 3, the jigger 4, the coherer 5 and the condensers 6—7 and then leading from there to the usual receiver 8. Within this circuit is located an inductance coil 9, designed to operate an armature 10 of a normally closed light circuit 11 to cause the closing of the signal circuit 12, wherein is located a bell or other sound producing apparatus 13, also a danger light signal 14, and a battery 15. Audible and visual warning is thus produced as soon as the wireless message is received. To determine the direction from where the waves are received, I surround each of the multiple antennæ 1 with a suitable inductance coil 16 and carry the induced current to the inductance coils 17, which are located similarly, with relation to each respective multiple wave receiving antenna, in circular fashion about a dial 18, upon which is mounted the polarized galvanometer needle 19, which is attracted to, duced current to the inductance coils 17, which receive the strongest electrical impulse thereby indicating accurately the position from which the current was sent.

In Figs. 2 and 3 is shown in detail the construction of the galvanometer referred to and consists of a case 20 of suitable form having mounted therein said inductance coils 17 in upright position around the inner periphery of said case 20 and has attached to the top end of said inductance coils 17, magnetic disks 21 of negative polarity, toward which the polarized galvanometer needle 19 is drawn when a current is passed through the circuit wiring of the induction coil, said magnetic disks having suitable reference letters or marks to designate direction or distinguish one from the other. The polarized galvanometer needle 19 is suitably mounted at its exact center of gravity upon the point 22 of a supporting pin 23, said needle 19 having a suitably formed seat 24 provided thereon and held in position to said supporting pin 23 by a projection 25 on the glass face 26 mounted in the case 20 above said polarized galvanometer needle 19. The supporting pin 23 is rigidly secured to a supporting pedestal 27 which is attached by the screws 28 to any suitable object and has provided at its upper surface a suitable bearing seat 29 upon which rests the trunnion 30, attached to the case 20, and is rotatably mounted in the case 20 in close proximity underneath the polarized galvanometer needle 19.

Means for adapting the instrument into proper relation to the ship is provided by the indicator support 33 which is mounted in suitable relation to the case 20 and attached by the screws 34, and has threaded through a hole 34$^A$ therein, an adjusting screw 35 whose end 36 bears against the case 20 and holds same in any desired position, with reference to the ship's course.

Means are thus provided to determine the direction of and approach or recession of ships at sea which carry wireless sending and receiving apparatus, and it is thereby possible to determine, by consecutive readings of the galvanometer, with reference to elapsed time and change of position, the direction and approximate speed of vessels sending the messages.

Having thus described my invention, what I claim and desire to secure by Letters Patent, is—

A wireless-receiving station including a group of circularly disposed antennæ electrically connected at their tops and bottoms, each of said antennæ including the primary of an induction coil, induction coil secondaries arranged adjacent the respective induction primaries, a magnetic needle mounted to revolve on a pivot, magnets arranged in a circle about the magnetic needle and connections between respective magnets and induction secondaries.

In testimony whereof I hereunto place my hand in the presence of two subscribing witnesses.

PAUL JUHASZ.

Witnesses:
EMIL G. J. BEER,
ANNA SABO.